(12) United States Patent
Jang et al.

(10) Patent No.: US 12,456,725 B2
(45) Date of Patent: Oct. 28, 2025

(54) ANODE FOR LITHIUM SECONDARY BATTERY AND LITHIUM SECONDARY BATTERY INCLUDING THE SAME

(71) Applicant: SK ON CO., LTD., Seoul (KR)

(72) Inventors: Hwan Ho Jang, Daejeon (KR); Moon Sung Kim, Daejeon (KR); Hyo Mi Kim, Daejeon (KR); Sang Baek Ryu, Daejeon (KR); Seung Hyun Yook, Daejeon (KR); Da Bin Chung, Daejeon (KR); Jun Hee Han, Daejeon (KR); Seong Cho Kwon, Daejeon (KR); Da Hye Park, Daejeon (KR); Sang Won Park, Daejeon (KR); Sang In Bang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/633,523

(22) Filed: Apr. 12, 2024

(65) Prior Publication Data
US 2024/0347708 A1    Oct. 17, 2024

(30) Foreign Application Priority Data

Apr. 17, 2023 (KR) .................. 10-2023-0050065

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/133* (2013.01); *H01M 4/134* (2013.01); *H01M 4/386* (2013.01);
(Continued)

(58) Field of Classification Search
None
See application file for complete search history.

(56) References Cited

U.S. PATENT DOCUMENTS

| 6,225,010 | B1 * | 5/2001 | Hamano | ........... H01M 10/0587 |
| | | | | 429/231.95 |
| 2021/0391570 | A1 | 12/2021 | Han et al. | |

(Continued)

FOREIGN PATENT DOCUMENTS

| CN | 113380998 A | * | 9/2021 |
| JP | 2001229914 A | * | 8/2001 |

(Continued)

OTHER PUBLICATIONS

Extended European Search Report for European Patent Application No. 24170373.5 issued by the European Patent Office on Sep. 26, 2024.

*Primary Examiner* — Zhongqing Wei
(74) *Attorney, Agent, or Firm* — IP & T GROUP LLP

(57) ABSTRACT

An anode for a lithium secondary battery includes an anode current collector, and an anode active material layer formed on at least one surface of the anode current collector. The anode active material layer includes a carbon-based active material, a first silicon-based active material including a carbon-silicon composite active material, and a second silicon-based active material including a silicon oxide ($SiO_x$, $0<x<2$). A content of the first silicon-based active material is in a range from 2 wt % to 40 wt % based on a total weight of the anode active material layer.

16 Claims, 3 Drawing Sheets

(51) Int. Cl.

| | |
|---|---|
| *H01M 4/133* | (2010.01) |
| *H01M 4/134* | (2010.01) |
| *H01M 4/38* | (2006.01) |
| *H01M 4/48* | (2010.01) |
| *H01M 4/583* | (2010.01) |
| *H01M 4/587* | (2010.01) |
| *H01M 4/62* | (2006.01) |
| *H01M 4/66* | (2006.01) |
| *H01M 10/052* | (2010.01) |
| *H01M 10/0525* | (2010.01) |

(52) U.S. Cl.
CPC ........... *H01M 4/583* (2013.01); *H01M 4/622* (2013.01); *H01M 10/052* (2013.01); *H01M 2004/027* (2013.01)

(56) References Cited

U.S. PATENT DOCUMENTS

| | | |
|---|---|---|
| 2022/0102708 A1 | 3/2022 | Wang et al. |
| 2022/0310991 A1 | 9/2022 | Lee et al. |
| 2022/0344659 A1* | 10/2022 | Oura ..................... H01M 4/364 |
| 2023/0016746 A1 | 1/2023 | Jun et al. |
| 2024/0030409 A1 | 1/2024 | Jang et al. |

FOREIGN PATENT DOCUMENTS

| | | |
|---|---|---|
| JP | 2004349057 A * | 12/2004 |
| KR | 10-1591698 B1 | 2/2016 |
| KR | 10-2016-0087121 A | 7/2016 |
| KR | 10-2413184 B1 | 6/2022 |
| KR | 10-2022-0125482 A | 9/2022 |
| KR | 10-2022-0169155 A | 12/2022 |
| KR | 10-2491619 B1 | 1/2023 |

* cited by examiner

ANODE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2023-0050065 filed on Apr. 17, 2023 in the Korean Intellectual Property Office (KIPO), the entire disclosure of which is incorporated by reference herein.

BACKGROUND

1. Field

The disclosure of this patent document relates to an anode for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., and an eco-friendly vehicle such as an electric automobile.

Examples of the secondary battery includes a lithium secondary battery, a nickel-cadmium battery, a nickel-hydrogen battery, etc. The lithium secondary battery is being actively developed and applied due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape accommodating the electrode assembly and the electrolyte.

Recently, as an application range of the lithium secondary battery has been expanded, a lithium secondary battery having higher capacity and power is being developed. For example, silicon and carbon can be used together for an anode active material to increase the capacity. However, cracks may occur in the anode and an electrolyte may be exposed during repeated charging and discharging due to a difference of volume expansion ratios between silicon and carbon.

SUMMARY

According to an aspect of the present invention, there is provided an anode for a lithium secondary battery having improved capacity and life-span properties.

According to an aspect of the present invention, there is provided a lithium secondary battery having improved capacity and life-span properties.

An anode for a lithium secondary battery includes an anode current collector, and an anode active material layer formed on at least one surface of the anode current collector. The anode active material layer includes a carbon-based active material, a first silicon-based active material including a carbon-silicon composite active material, and a second silicon-based active material including a silicon oxide ($SiO_x$, $0<x<2$). A content of the first silicon-based active material is in a range from 2 wt % to 40 wt % based on a total weight of the anode active material layer.

In some embodiments, the anode active material layer may include a first anode active material layer and a second anode active material layer sequentially stacked from a surface of the anode current collector.

In some embodiments, the first anode active material layer may include the first silicon-based active material and the carbon-based active material, and the second anode active material layer may include the second silicon-based active material and the carbon-based active material.

In some embodiments, the first anode active material layer and the second anode active material layer may include the first silicon-based active material and the second silicon-based active material, respectively. A content of the first silicon-based active material included in the first anode active material layer may be greater than or equal to a content of the second silicon-based active material included in the first anode active material layer. A content of the first silicon-based active material included in the second anode active material layer may be less than or equal to a content of the second silicon-based active material included in the second anode active material layer.

In some embodiments, the first anode active material layer may include the second silicon-based active material and the carbon-based active material, and the second anode active material layer may include the first silicon-based active material and the carbon-based active material.

In some embodiments, the first anode active material layer and the second anode active material layer may include the first silicon-based active material and the second silicon-based active material, respectively. A content of the first silicon-based active material included in the first anode active material layer may be less than or equal to a content of the second silicon-based active material included in the first anode active material layer. A content of the first silicon-based active material included in the second anode active material layer may be greater than or equal to a content of the second silicon-based active material included in the second anode active material layer.

In some embodiments, a content of the second silicon-based active material may be in a range from 3 wt % to 30 wt % based on the total weight of the anode active material layer.

In some embodiments, a sum of contents of the first silicon-based active material and the second silicon-based active material may be in a range from 5 wt % to 60 wt % based on the total weight of the anode active material layer.

In some embodiments, the carbon-based active material may include artificial graphite.

In some embodiments, the carbon-based active material may further include natural graphite, and a content of natural graphite included in the anode active material layer may be less than or equal to a content of artificial graphite included in the anode active material layer.

In some embodiments, the carbon-silicon composite active material may include a porous carbon core and a silicon coating formed on the porous carbon core.

In some embodiments, the carbon-silicon composite active material may further include a coating layer formed at an outermost portion of the carbon-silicon composite active material.

In some embodiments, the coating layer may include at least one selected from the group consisting of a carbon coating, an oxide film coating and a polymer coating.

In some embodiments, the second silicon-based active material may include at least one dopant selected from Li, Mg, Al, Ca, Fe, Ti and V. These may be used alone or in a combination thereof.

In some embodiments, the anode may further include a primer layer disposed between the anode current collector and the anode active material layer. The primer layer may include an anode binder.

In some embodiments, the anode binder may include at least one selected from the group consisting of styrene-butadiene rubber (SBR), carboxymethyl cellulose (CMC), polyacrylic acid (PAA), polyvinyl alcohol (PVA). These may be used alone or in a combination thereof.

In some embodiments, the primer layer may further include the carbon-based active material, the first silicon-based active material and/or the second silicon-based active material.

A lithium secondary battery includes the anode for a lithium secondary battery according to the above-described embodiments, and a cathode facing the anode.

An anode for a lithium secondary battery according to embodiments of the present disclosure may include an anode active material layer that includes a carbon-based active material, a first silicon-based active material including a carbon-silicon composite active material, and a second silicon-based active material including a silicon oxide (SiOx, 0<x<2).

For example, the first silicon-based active material including the carbon-silicon composite active material may have small contraction and expansion amount during charging and discharging. Therefore, generation of cracks in the anode active material during charging and discharging may be suppressed, and life-span characteristics at room temperature of the lithium secondary battery may be improved.

For example, the second silicon-based active material including the silicon oxide may have a high capacity and may improve mobility of lithium ions. Accordingly, high capacity characteristics and rapid charging characteristics of the lithium secondary battery may be improved.

In some embodiments, an anode active material layer may have a double-layered structure of a first anode active material layer and a second anode active material layer. Contents of the first silicon-based active material and the second silicon-based active material included in the first anode active material layer and the second anode active material layer may be controlled, so that the life-span characteristics at room temperature and rapid charging life-span characteristics of the lithium secondary battery may be improved.

DETAILED DESCRIPTION OF THE EMBODIMENTS

According to embodiments of the present disclosure, an anode for a lithium secondary battery including an anode active material layer is provided. According to embodiments of the present disclosure, a lithium secondary battery including the anode is also provided.

Figure 1:
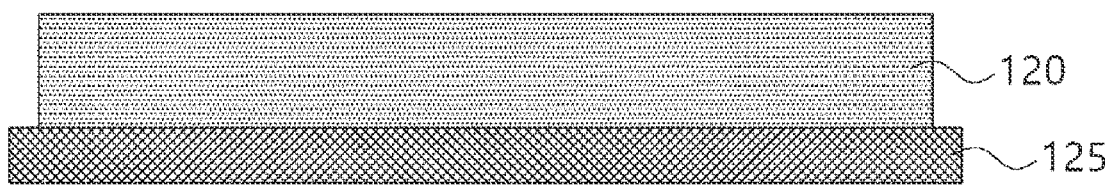
FIG. 1 is a schematic cross-sectional view illustrating an anode for a lithium secondary battery in accordance with example embodiments.

FIG. 1 is a schematic cross-sectional view illustrating an anode for a lithium secondary battery in accordance with example embodiments.

Referring to FIG. 1, an anode 130 may include an anode current collector 125 and an anode active material layer 120 formed on the anode current collector 125. For convenience of illustration, FIG. 1 illustrates that the anode active material layer 120 is formed on one surface of the anode current collector 125, but the anode active material layer 120 may be formed on each of both surfaces (upper and lower surfaces) of the anode current collector 125.

For example, the anode current collector 125 may include a metal having a high conductivity and an improved adhesion to an anode slurry, and being non-reactive in a voltage range of the secondary battery. For example, the anode current collector 125 may include copper, stainless steel, nickel, titanium or an alloy thereof. The anode current collector 125 may include copper or stainless steel surface-treated with carbon, nickel, titanium or silver.

In example embodiments, the anode active material layer 120 including a silicon-based active material and a carbon-based active material may be formed on at least one surface of the anode current collector 125.

The term "carbon-based active material" as used herein may refer to a carbon-based active material that does not contain silicon.

In example embodiments, the silicon-based active material may include a first silicon-based active material including a carbon-silicon composite active material and a second silicon-based active material including a silicon oxide (SiOx, 0<x<2).

In an embodiment, the first silicon-based active material above may substantially consist of the carbon-silicon composite active material. In an embodiment, the first silicon-based active material may include the carbon-silicon composite active material, and may not include the silicon oxide (SiOx, 0<x<2).

In an embodiment, the second silicon-based active material may substantially consist of silicon oxide (SiOx, 0<x<2). In an embodiment, the second silicon-based active material may include the silicon oxide (SiOx, 0<x<2) and may not include the carbon-silicon composite active material.

In some embodiments, the carbon-silicon composite active material may include a porous carbon core and a silicon coating formed on the porous carbon core. For example, the porous carbon core may include a carbon-based particle including micropores, and the silicon coating may be formed at an inside and/or on a surface of the carbon-based particle.

Accordingly, a contraction and an expansion when charging and discharging a lithium secondary battery may be reduced, and cracks in the anode active material due to a difference of volume expansion ratio of silicon and carbon may be prevented. Thus, life-span characteristics at room temperature of the lithium secondary battery may be improved.

According to an embodiment, the carbon-based particle may include an activated carbon, a carbon nanotube, a carbon nanowire, graphene, a carbon fiber, carbon black, graphite, a porous carbon, a pyrolyzed cryogel, a pyrolyzed xerogel, a pyrolyzed aerogel, etc. These may be used alone or in a combination of two or more therefrom.

In some embodiments, the carbon-based particle may include an amorphous structure or a crystalline structure. For example, the carbon-based particle above may include the amorphous structure, and thus durability of the anode active material may be increased. Thus, when the battery is charged and discharged or subjected to an external impact, cracks may be suppressed.

In an embodiment, the silicon coating may have an amorphous structure, and the amorphous structure may refer that a single silicon included in the silicon coating is amorphous.

In some embodiments, the silicon coating may be formed by a deposition process (e.g., a chemical vapor deposition (CVD) process). For example, a silicon precursor may be supplied to the carbon-based particle, and silicon grains separated from the silicon precursor may be deposited on the carbon-based particle to form the silicon coating.

In example embodiments, a content of the first silicon-based active material may be in a range from 2 weight percent (wt %) to 40 wt % based on a total weight of the anode active material layer 120. In an embodiment, the content of the first silicon-based active material may be in a range from 5 wt % to 35 wt %, from 10 wt % to 30 wt %, or from 10 wt % to 25 wt %.

If the content of the first silicon-based active material based on the total weight of the anode active material layer 120 is greater than 40 wt %, an energy density of the anode active material may be decreased and rapid charging life-span characteristics of the lithium secondary battery may be deteriorated. If the content of the first silicon-based active material based on the total weight of the anode active material layer 120 is less than 2 wt %, cracks in the anode active material may not be sufficiently prevented during charging and discharging and the life-span characteristics at room temperature of the lithium secondary battery may be deteriorated.

In some embodiments, the carbon-silicon composite-based material may further include a coating layer formed on an outermost portion of the carbon-silicon composite active material. Accordingly, silicon of the first silicon-based active material may be prevented from contacting moisture in an atmosphere and/or water in the anode slurry. Thus, reduction of a discharge capacity of the lithium secondary battery may be suppressed.

For example, the coating layer above may be formed on the silicon coating above, and may also be formed on a portion of the porous carbon core on which the silicon coating is not formed. For example, the coating layer may also be formed on a portion of the inside and the surface of the carbon-based particle on which the silicon coating is not formed.

For example, the coating layer above may entirely cover silicon and carbon-based particles on the porous carbon core on which the silicon coating is formed. Accordingly, mechanical and chemical stability of the anode active material may be improved while blocking the contact between silicon and water.

In some embodiments, the coating layer formed on the outermost portion of the carbon-silicon composite active material may include a carbon coating, an oxide coating, and/or a polymer coating.

In an embodiment, the coating layer may substantially consist of the carbon coating. For example, the carbon coating may include an amorphous carbon, a carbon nanotube, a carbon nanofiber, graphite, graphene, graphene oxide and/or a reduced graphene oxide. For example, the carbon coating may be formed by a chemical vapor deposition (CVD) process using a carbon-based precursor.

For example, the oxide coating may include titanium oxide, silicon oxide, zirconium oxide, molybdenum oxide, aluminum oxide, zinc oxide, manganese oxide and/or a tin oxide.

For example, the polymer coating may include polyacrylate, polyacrylonitrile, polyethylene oxide, polyvinylpyrrolidone, polyacrylic acid, polyvinyl alcohol, polyethyleneimine, polyacetylene, polyparaphenylene, polypyrrole and/or polyaniline.

In some embodiments, a content of the second silicon-based active material may be in a range from 3 wt % to 30 wt %, from 5 wt % to 25 wt %, or from 5 wt % to 15 wt % based on a total weight of the anode active material layer 120. In the above range, a high energy density of the anode active material may be maintained and the rapid charge life-span characteristics of the lithium secondary battery may be further improved.

In some embodiments, a sum of the contents of the first silicon-based active material and the second silicon-based active material may be in a range from 5 wt % to 60 wt %, from 10 wt % to 50 wt %, or from 15 wt % to 45 wt % based on the total weight of the anode active material layer 120.

In the above range, a rapid increase of the volume expansion ratio relative to the energy density of the lithium secondary battery may be prevented. Accordingly, the life-span characteristics during rapid charging and discharging of the lithium secondary battery may be further improved.

In some embodiments, the second silicon-based active material may include at least one dopant of lithium (Li), magnesium (Mg), aluminum (Al), calcium (Ca), iron (Fe), titanium (Ti) and vanadium (V). Conductivity and/or structural stability of the anode active material may be further improved by the dopant.

For example, when Mg is included as the dopant of the second silicon-based active material, swelling of the second silicon-based active material may be reduced, thereby improving the life-span characteristics of the lithium secondary battery.

In some embodiments, the carbon-based active material may include artificial graphite. In an embodiment, the carbon-based active material may include both artificial graphite and natural graphite.

When only natural graphite is used as the anode active material, an adhesion to the anode current collector may be enhanced, but a resistance may be increased during the rapid charging and discharging, and the power characteristics may be relatively lowered. When the silicon-based active material is expanded, natural graphite may be damaged and mobility of the lithium ions may be decreased. Accordingly, a side reaction may occur in the anode and the life-span characteristics of the lithium secondary battery may be relatively lowered.

In example embodiments, the carbon-based active material included in the anode active material layer 120 may include artificial graphite and natural graphite. Accordingly, the adhesion between the anode current collector 125 and the anode active material layer 120 and the power characteristics of the secondary battery may be improved.

In some embodiments, a content (wt %) of natural graphite included in the anode active material layer 120 may be less than or equal to a content (wt %) of artificial graphite included in the anode active material layer 120. Accordingly, the life-span characteristics and durability of the lithium secondary battery may be further improved.

For example, the anode active material layer 120 may be formed by coating, drying and pressing an anode active material composition including the carbon-based active material, the first silicon-based active material and the second silicon-based active material on the anode current collector 125.

For example, the anode active material composition may be prepared by mixing the carbon-based active material, the first silicon-based active material and the second silicon-based active material with an anode binder, a conductive material, a thickener and/or a dispersant in a solvent.

The solvent may be an aqueous solvent such as water, an aqueous hydrochloric acid solution or an aqueous sodium hydroxide solution, or a non-aqueous solvent such as N-methyl-2-pyrrolidone (NMP), dimethylformamide, dimethylacetamide, N, N-dimethylaminopropylamine, ethylene oxide, tetrahydrofuran, etc.

For example, the anode binder may include a polymer material such as styrene-butadiene rubber (SBR). The thickener may include carboxylmethyl cellulose (CMC).

The conductive material may be included to promote an electron transfer between active material particles. For example, the conductive material may include a carbon-based conductive material such as graphite, carbon black, graphene, a carbon nanotube, and/or a metal-based conductive material including tin, tin oxide, titanium oxide, a perovskite material such as $LaSrCoO_3$ and $LaSrMnO_3$, etc.

In example embodiments, the silicon-based active material and the carbon-based active material may be used together to improve the life-span characteristics while utilizing high capacity characteristics of silicon.

Figure 2:
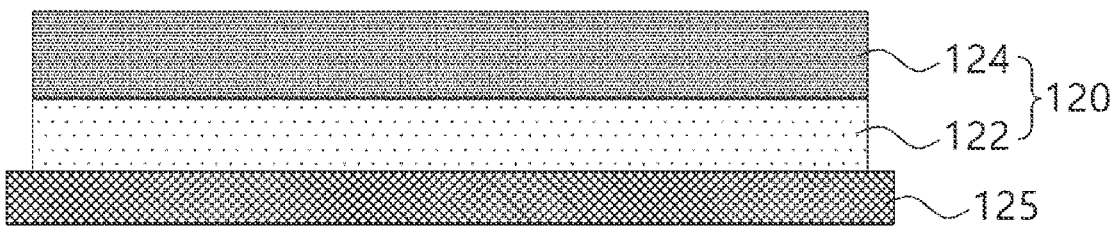
FIG. 2 is a schematic cross-sectional view illustrating an anode for a lithium secondary battery in accordance with example embodiments.

FIG. 2 is a schematic cross-sectional view illustrating an anode for a lithium secondary battery in accordance with example embodiments.

For convenience of descriptions, FIG. 2 illustrates the anode active material layer 120 is formed on one surface of the anode current collector 125, but the anode active material layer 120 may be formed on each of both surfaces (upper and lower surfaces) of the anode current collector 125.

Referring to FIG. 2, the anode active material layer 120 may include a first anode active material layer 122 and a second anode active material layer 124 sequentially stacked from the surface of the anode current collector 125. For example, the anode active material layer 120 may include a double-layered structure including the first anode active material layer 122 and a second anode active material layer 124 sequentially stacked from the anode current collector 125.

For example, the second anode active material layer 124 may be disposed at an outermost portion of the anode 130.

In example embodiments, the first silicon-based active material including the carbon-silicon composite active material is used so that the life-span characteristics at room temperature may be improved.

In some embodiments, the first anode active material layer 122 and the second anode active material layer 124 may have different active material compositions.

In an embodiment, the first anode active material layer 122 may include the first silicon-based active material and the carbon-based active material, and the second anode active material layer 124 may include the second silicon-based active material and the carbon-based active material.

For example, the first anode active material layer 122 may include an anode active material substantially consisting of the first silicon-based active material and the carbon-based active material, and the second anode active material layer 124 may include an anode active material substantially consisting of the second silicon-based active material and the carbon-based active material.

For example, the first anode active material layer 122 may not include the second silicon-based active material, and the second anode active material layer 124 may not include the first silicon-based active material.

In some embodiments, each of the first anode active material layer 122 and the second anode active material layer 124 may include the first silicon-based active material and the second silicon-based active material. For example, the first anode active material layer 122 and the second anode active material layer 124 may each include the carbon-based active material, the first silicon-based active material and the second silicon-based active material.

In an embodiment, a content (wt %) of the first silicon-based active material included in the first anode active material layer 122 may be greater than or equal to a content (wt %) of the second silicon-based active material included in the first anode active material layer 122. A content (wt %) of the first silicon-based active material included in the second anode active material layer 124 may be less than or equal to a content (wt %) of the second silicon-based active material included in the second anode active material layer 124.

Accordingly, a relatively small amount of the first silicon-based active material including the carbon-silicon composite active material may be included in the second anode active material layer 124 reacting with an outside at an outermost portion of the anode, and a relatively large amount of the first silicon-based active material may be included in the first anode active material layer 122.

Thus, exfoliation due to an expansion of the anode active material in the first anode active material layer 122 may be suppressed, and thus the life-span characteristics during rapid charging and the life-span characteristics at room temperature may be improved.

In an embodiment, the first anode active material layer 122 may include the second silicon-based active material and the carbon-based active material, and the second anode active material layer 124 may include the first silicon-based active material and the carbon-based active material.

For example, the first anode active material layer 122 may include an anode active material substantially consisting of the second silicon-based active material and the carbon-based active material, and the second anode active material layer 124 may include an anode active material substantially consisting of the first silicon-based active material and the carbon-based active material.

For example, the first anode active material layer 122 may not include the first silicon-based active material, and the second anode active material layer 124 may not include the second silicon-based active material.

In an embodiment, a content (wt %) of the first silicon-based active material included in the first anode active material layer 122 may be less than or equal to a content (wt %) of the second silicon-based active material included in the first anode active material layer 122. A content (wt %) of the first silicon-based active material included in the second anode active material layer 124 may be greater than or equal to a content (wt %) of the second silicon-based active material included in the second anode active material layer 124.

For example, a content ratio of the first silicon-based active material in the first anode active material layer 122 and the second anode active material layer 124 may be adjusted to improve the rapid charge life-span characteristic and the life-span characteristic at room temperature may be improved.

In some embodiments, a thickness of the first anode active material layer 122 may be 10% to 90% of a total thickness of the anode active material layer 120. In the above thickness range, the rapid charge life-span characteristics and the life-span characteristics at room temperature may be improved.

In an embodiment, a thickness of the first anode active material layer 122 and a thickness of the second anode active material layer 124 may be substantially the same.

For example, a first anode active material composition including the carbon-based active material, the first silicon-based active material and the second silicon-based active material may be coated, dried and pressed on the anode current collector 125 to form the first anode active material layer 122.

For example, a second anode active material composition including the carbon-based active material, the first silicon-based active material and the second silicon-based active material may be coated, dried and pressed on the first anode active material layer 122 to form the second anode active material layer 124.

For example, the carbon-based active material, the first silicon-based active material and the second silicon-based active material may be mixed with an anode binder, a conductive material and/or a dispersant in a solvent to prepare the first anode active material composition and the second anode active material composition, respectively.

Figure 3:
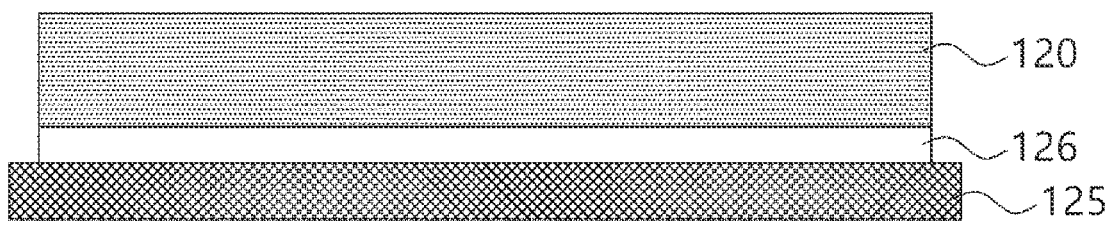
FIG. 3 is a schematic cross-sectional view illustrating an anode for a lithium secondary battery in accordance with example embodiments.

FIG. 3 is a schematic cross-sectional view illustrating an anode for a lithium secondary battery in accordance with example embodiments.

For convenience of descriptions, FIG. 3 illustrates the anode active material layer 120 is formed on one surface of the anode current collector 125, but the anode active material layer 120 may be formed on each of both surfaces (upper and lower surfaces) of the anode current collector 125.

Referring to FIG. 3, a primer layer 126 including an anode binder may be further disposed between the anode current collector 125 and the anode active material layer 120. Accordingly, a content of the anode binder included in the anode active material layer 120 may be reduced and a content of the anode active material may be increased. Thus, capacity characteristics of the anode 130 may be improved.

The anode binder included in the primer layer 126 may include at least one selected from the group consisting of styrene-butadiene rubber (SBR), carboxylmethyl cellulose (CMC), polyacrylic acid (PAA) and/or polyvinyl alcohol (PVA).

In an embodiment, the primer layer 126 may include a carbon-based conductive material and/or a metal-based conductive material to improve a conductivity. For example, the carbon-based conductive material may include graphite, carbon black, graphene, a carbon nanotube, (e.g., a single-walled carbon nanotube or a multi-walled carbon nanotubes), etc., and the metal-based conductive material may include tin, tin oxide, titanium oxide, $LaSrCoO_3$, $LaSrMnO_3$, etc.

In some embodiments, the primer layer 126 may further include the carbon-based active material, the first silicon-based active material and/or the second silicon-based active material. Accordingly, the life-span characteristics may be additionally improved.

Figure 4:
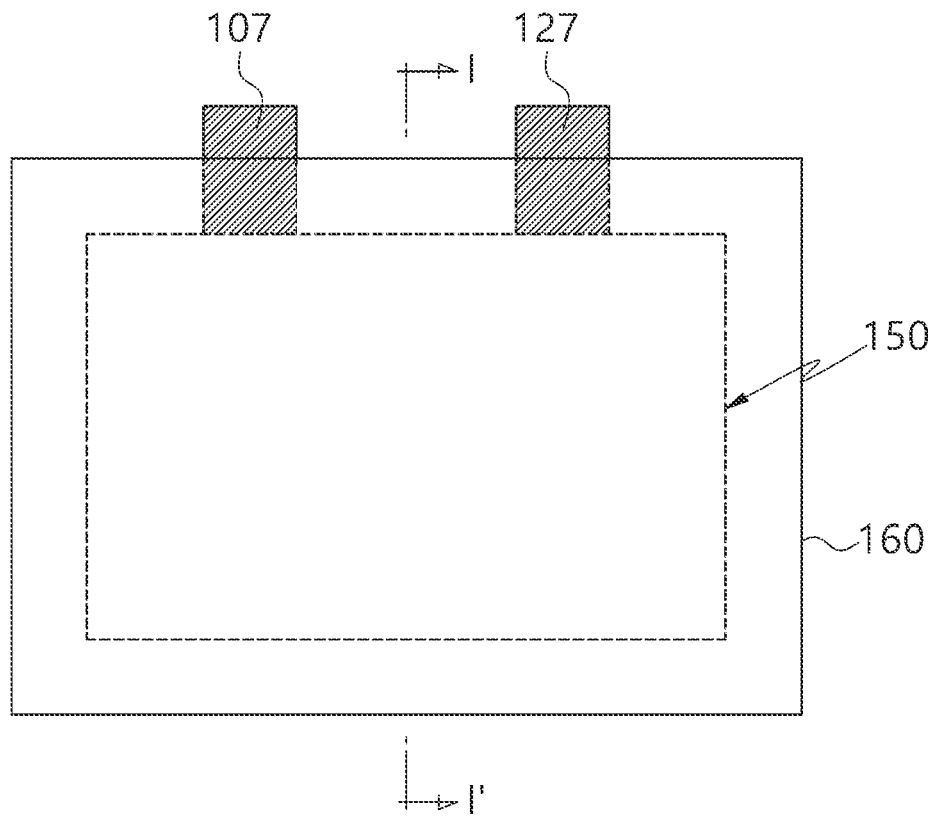
FIG. 4 and FIG. 5 are a schematic plan view and a schematic cross-sectional view, respectively, illustrating a lithium secondary battery in accordance with example embodiments.
Figure 5:
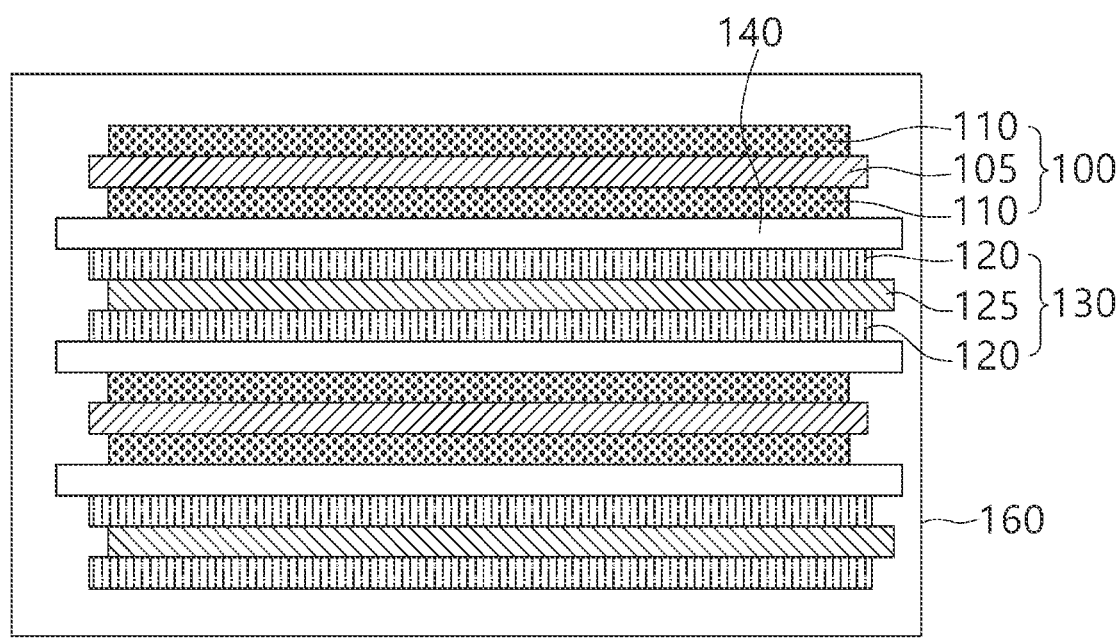

FIG. 4 and FIG. 5 are a schematic plan view and a schematic cross-sectional view, respectively, illustrating a lithium secondary battery in accordance with example embodiments. For example, FIG. 5 is a cross-sectional view taken along line I-I' of FIG. 4 in a thickness direction.

The structure illustrated in FIGS. 4 and 5 is only an example for convenience of descriptions, and the lithium secondary battery provided by the present disclosure is not limited to the structure of FIGS. 4 and 5.

Referring to FIGS. 4 and 5, the lithium secondary battery may include an electrode assembly 150 including the above-described anode 130 and a cathode 100 facing the anode 130. The electrode assembly 150 may be accommodated together with an electrolyte in a case 160 to be impregnated therein.

The cathode 100 may include a cathode active material layer 110 formed by coating a mixture including a cathode active material on at least one surface of a cathode current collector 105.

The cathode current collector 105 may include stainless steel, nickel, aluminum, titanium, or an alloy thereof. The cathode current collector 105 may include aluminum or stainless steel surface-treated with carbon, nickel, titanium, silver, etc.

The cathode active material may include a compound capable of reversibly intercalating and de-intercalating lithium ions.

In example embodiments, the cathode active material may include a lithium-nickel-based metal oxide. For example, the lithium-nickel-based metal oxide may include nickel (Ni), and may further include at least one of cobalt (Co) and manganese (Mn).

For example, the lithium-nickel-based metal oxide may be represented by Chemical Formula 1 below.

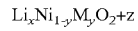   [Chemical Formula 1]

In Chemical Formula 1, $0.9 \leq x \leq 1.2$, $0 \leq y \leq 0.7$, or $-0.1 \leq z \leq 0.1$. M may include at least one element selected from Na, Mg, Ca, Y, Ti, Hf, V, Nb, Ta, Cr, Mo, W, Mn, Co, Fe, Cu, Ag, Zn, B, Al, Ga, Sn and Zr.

In some embodiments, a molar ratio or concentration (1-y) of Ni in Chemical Formula 1 may be greater than or equal to 0.8, e.g., greater than 0.8.

A mixture may be prepared by mixing and stirring the cathode active material with a cathode binder, a conductive material and/or a dispersant in a solvent. The mixture may be coated on the cathode current collector 105, and then dried and pressed to prepare the cathode 100.

A non-aqueous solvent may be used as the solvent. Non-limiting examples of the non-aqueous solvent may include N-methyl-2-pyrrolidone (NMP), dimethylformamide, dimethylacetamide, N,N-dimethylaminopropylamine, ethylene oxide, tetrahydrofuran, etc.

For example, the cathode binder may include an organic binder such as a vinylidene fluoride-hexafluoropropylene copolymer (PVDF-co-HFP), polyvinylidenefluoride (PVDF), polyacrylonitrile, polymethylmethacrylate, or an aqueous binder such as styrene-butadiene rubber (SBR). The cathode binder may be used together with a thickener such as carboxymethyl cellulose (CMC).

A PVDF-based binder may be used as the cathode binder. In this case, an amount of the binder for forming the cathode active material layer may be reduced, and an amount of the cathode active material may be relatively increased, and thus power and capacity of the secondary battery may be improved.

The conductive material may include substantially the same compound as that used for forming the anode active material layer 120.

The anode 130 may be formed as described above.

A separator 140 may be interposed between the cathode 100 and the anode 130. The separator 140 may include a porous polymer film formed of a polyolefin-based polymer such as an ethylene homopolymer, a propylene homopolymer, an ethylene/butene copolymer, an ethylene/hexene copolymer, an ethylene/methacrylate copolymer, etc. The separator 140 may include a nonwoven fabric formed of a glass fiber having a high melting point, a polyethylene terephthalate fiber, etc.

In some embodiments, an area and/or a volume of the anode 130 (e.g., a contact area with the separator 140) may be greater than that of the cathode 100. Thus, lithium ions generated from the cathode 100 may be easily transferred to the anode 130 without loss by, e.g., precipitation or sedimentation. Thus, the improvements of capacity and power according to the above-mentioned anode active material may be more easily implemented.

In example embodiments, an electrode cell may be defined by the cathode 100, the anode 130 and the separator 140, and a plurality of the electrode cells may be stacked to form an electrode assembly 150 having, e.g., a jelly roll shape. For example, the electrode assembly 150 may be formed by winding, stacking or folding of the separator 140.

The electrode assembly 150 may be accommodated together with the electrolyte in the case 160 to define a lithium secondary battery. In example embodiments, a non-aqueous electrolyte solution may be used as the electrolyte.

For example, the non-aqueous electrolyte solution may include a lithium salt as the electrolyte and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 4, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a prismatic shape, a pouch shape or a coin shape.

Hereinafter, experimental examples embodiments including examples and comparative examples are proposed to more concretely describe embodiments of the present disclosure. However, the following examples are only given for illustrating the present disclosure and those skilled in the related art will obviously understand that various alterations and modifications are possible within the scope and spirit of the present disclosure.

Example 1

(1) Fabrication of Anode
1) Preparation of First Silicon-Based Active Material
1-1) Preparation of Carbon-Based Particles Resorcinol and formaldehyde were mixed with water in a molar ratio of 1:2 to prepare a polymer precursor solution. The mixture of resorcinol and formaldehyde and water were mixed in a weight ratio of 1:10. Sodium carbonate was added to the polymer precursor solution as a catalyst. A molar ratio of resorcinol to the catalyst was adjusted to 500. Thereafter, a polymerization was performed at 80° C. for 3 days to form a polymer gel.

After the polymerization, the polymer gel was completely dried at 60° C. or less, and then carbonized in an $N_2$ atmosphere at a temperature of 850° C. The carbonized product was pulverized to prepare carbon-based particles.

1-2) Formation of a Silicon Coating

A silicon coating was formed by depositing silicon at an inside and/or on a surface of the carbon-based particle by a chemical vapor deposition (CVD) process using $SiH_4$ as a precursor.

Specifically, 7.5 g of the above-prepared carbon-based particles were loaded into a CVD chamber, and the CVD process was performed under conditions of a temperature of 500° C., a pressure of 760 torr, a $SiH_4$ flow rate of 50 sccm, an $N_2$ flow rate of 450 sccm, and a deposition time of 360 minutes.

Accordingly, a carbon-silicon composite active material including a porous carbon core and a silicon coating was obtained, and the carbon-silicon composite active material was used as a first silicon-based active material.

2) Formation of Anode Active Material Layer

Water was added to 50.5 wt % of artificial graphite (D50: 20 μm) as a carbon-based active material, 30 wt % of the above-prepared first silicon-based active material, 15 wt % of silicon oxide (SiOx, 0<x<2, D50: 5 μm) doped with Mg as the second silicon-based active material, 1.5 wt % of a CMC binder, 2.5 wt % of a SBR binder, 0.2 wt % of a SWCNT conductive material and 0.3 wt % of a CNT dispersant to prepare an anode active material composition in the form of a slurry.

The prepared anode active material composition was coated, dried and pressed on one surface of a copper current collector (8 μm-thick copper foil) to obtain an anode including an anode active material layer.

(2) Fabrication of Lithium Secondary Battery $Li[Ni_{0.88}Co_{0.1}Mn_{0.02}]O_2$ as a cathode active material, MWCNT as a conductive material and polyvinylidene fluoride (PVdF) as a binder were mixed in a weight ratio of 98.08:0.72:1.2, thereby preparing a slurry. The slurry was uniformly coated on an aluminum foil having a thickness of 12 μm and vacuum-dried to prepare a cathode for a secondary battery. About 20 wt % of the MWCNT content was included by a CNT dispersant.

The cathode and the anode were notched in predetermined sizes, and an electrode cell was formed by interposing a separator (polyethylene, thickness 13 μm) between the anode and the cathode. Tab portions of the anode and the cathode were welded. The welded anode/separator/cathode assembly was put in a pouch, and three sides except for an electrolyte injection side were sealed. A region around the tab portions was included in the sealing portion.

An electrolyte solution was injected through the electrolyte injection side, and the electrolyte injection side was also sealed. Thereafter, an impregnation was performed for 12 hours or more.

As the electrolyte solution, a 1.1M $LiPF_6$ solution was prepared using a mixed solvent of EC/EMC (25/75; volume ratio), and 8 wt % of fluoroethylene carbonate (FEC), 0.5 wt % of 1,3-propenesultone (PRS), 0.5 wt % of 1,3-propanesultone (PS) and 0.5 wt % of ethylene sulfate (ESA) were added thereto.

Thereafter, a heat press pre-charging was performed for 60 minutes with a current corresponding to an average of 0.5 C. After stabilization for 12 hours or more, degassing was performed, aging was performed for 24 hours or more, and then a formation charging/discharging was performed (charging condition CC-CV 0.25 C 4.2V 0.05 C CUT-OFF, discharging condition CC 0.25 C 2.5V CUT-OFF).

Thereafter, a standard charging/discharging was performed (charging condition CC-CV 0.33 C 4.2 V 0.05 C CUT-OFF, discharging condition CC 0.33 C 2.5 V CUT-OFF).

Example 2

An anode active material layer was formed as a double-layered structure.

Specifically, water was added to 64.5 wt % of artificial graphite (D50: 20 μm) as the carbon-based active material, 30 wt % the above-prepared first silicon-based active material produced, 1.5 wt % of a CMC binder, 3.5 wt % of a SBR binder, 0.2 wt % of a SWCNT conductive material and 0.3 wt % of a CNT dispersant to prepare a first anode active material composition in the form of a slurry.

Water was added to 66.5 wt % of artificial graphite (D50: 20 μm) as the carbon-based active material, 30 wt % by weight of silicon oxide (SiOx, 0<x<2, D50: 5 μm) doped with Li as the second silicon-based active material, 1.5 wt % of a CMC binder, 1.5 wt % of a SBR binder, 0.2 wt % of a SWCNT conductive material and 0.3 wt % of a CNT dispersant to prepare a second anode active material composition in the form of a slurry.

The first anode active material composition and the second anode active material composition were sequentially coated on one surface of a copper current collector (8 μm-thick copper foil), dried and pressed to form a first anode active material layer and a second anode active material layer.

An anode and a lithium secondary battery were manufactured by the same method as that in Example 1, except for the above details.

Example 3

An anode and a lithium secondary battery were manufactured by the same method as that in Example 2, except that 30 wt % of silicon oxide doped with Mg was added instead of 30 wt % of silicon oxide doped with Li when preparing the second anode active material composition.

Example 4

When preparing the first anode active material composition, 30 wt % of a mixture of the first silicon-based active material and Mg-doped silicon oxide in a weight ratio of 2:1 was added instead of 30 wt % of the first silicon-based active material. When preparing the second anode active material composition, 30 wt % of a mixture of the first silicon-based active material and Mg-doped silicon oxide in a weight ratio of 1:2 was added instead of 30 wt % of Li-doped silicon oxide. An anode and a lithium secondary battery were manufactured by the same method as that in Example 2, except for the above details.

Example 5

An anode and a lithium secondary battery were manufactured by the same method as that in Example 2, except that the same amount of silicon oxide (SiOx, 0<x<2, D50: 5 μm) doped with Mg was added instead of the first silicon-based active material when preparing the first anode active material composition, and the same amount of the first silicon-based active material was added instead of silicon oxide doped with Li when preparing the second anode active material composition.

Example 6

A primer layer was formed between the anode active material layer and the copper current collector.

Specifically, 2.0 wt % of a SBR binder was added to a remaining amount of water to form a primer composition. The primer composition was coated on one surface of a copper current collector (8 μm-thick copper foil) to form the primer layer.

When preparing the anode active material composition, the contents of artificial graphite and the SBR binder were changed to 51.5 wt % and 1.5 wt %, respectively.

An anode and a lithium secondary battery were manufactured by the same manner as that in Example 1, except for the above details.

Example 7

An acetylene ($C_2H_2$) gas as a carbon-based precursor was flowed at a flow rate of 1500 sccm for 5 minutes at 900° C. to form a carbon coating on an outermost portion of the first silicon-based active material.

An anode and a lithium secondary battery were manufactured by the same method as that in Example 1, except that 30 wt % of the first silicon-based active material having the carbon coating formed thereon was added instead of 30 wt % of the first silicon-based active material when preparing the anode active material composition.

Example 8

An anode and a lithium secondary battery were manufactured by the same method as that in Example 1, except that 50.5 wt % of natural graphite was added instead of 50.5 wt % of artificial graphite when preparing the anode active material composition.

Example 9

An anode and a lithium secondary battery were manufactured by the same manner as that in Example 1, except that 30.35 wt % of artificial graphite and 20.15 wt % of natural graphite were added instead of 50.5 wt % of artificial graphite when preparing the anode active material composition.

Comparative Example 1

An anode and a lithium secondary battery were manufactured by the same manner as that in Example 1, except that 45 wt % of the first silicon-based active material was solely used instead of 30 wt % of the first silicon-based active material and 15 wt % of silicon oxide doped with Mg when preparing the anode active material composition.

Comparative Example 2

An anode and a lithium secondary battery were manufactured by the same method as that in Example 1, except that 45 wt % of silicon oxide doped with Mg was solely used instead of 30 wt % of the first silicon-based active material and 15 wt % of silicon oxide when preparing the anode active material composition.

Comparative Example 3

An anode and a lithium secondary battery were manufactured by the same method as that in Example 1, except that 1 wt % of the first silicon-based active material and 44 wt % of silicon oxide doped with Mg were added instead of 30 wt % of the first silicon-based active material and 15 wt % of silicon oxide doped with Mg when preparing the anode active material composition.

Comparative Example 4

An anode and a lithium secondary battery were manufactured by the same method as that in Example 2, except that the same amount of silicon oxide doped with of Mg was added instead of the first silicon-based active material when preparing the first anode active material composition and the same amount of silicon oxide doped with Mg was added instead of silicon oxide doped with Li when preparing the second anode active material composition.

Experimental Example

1. Evaluation on Normal (Room Temperature) Life-Span Characteristics Evaluation (25° C.)

The lithium secondary batteries prepared according to Examples 1 to 9 (Ex. 1 to Ex. 9 in FIGS. 6 and 7) and Comparative Examples 1 to 4 (CE. 1 to CE. 4 in FIGS. 6 and 7) were put into a chamber maintained at 25° C., and normal charge life-span characteristics were evaluated in a range of DOD (Depth of discharge) 94 (SOC (State of charge) 4-98).

The charge was performed at 0.3 C up to a voltage corresponding to an SOC98 under a constant current/constant voltage (CC/CV) condition, and then the charge was cut off at 0.05 C, and then a discharge was performed to a voltage corresponding to SOC4 under a constant current (CC) condition to measure a discharge capacity. The charge and discharge were repeatedly performed in 1000 cycles to measure a discharge capacity according to the number of cycles (# of cycles), and a discharge capacity measured in each cycle was calculated as a ratio (%) to the discharge capacity at the first cycle to measure a capacity retention.

Figure 6:
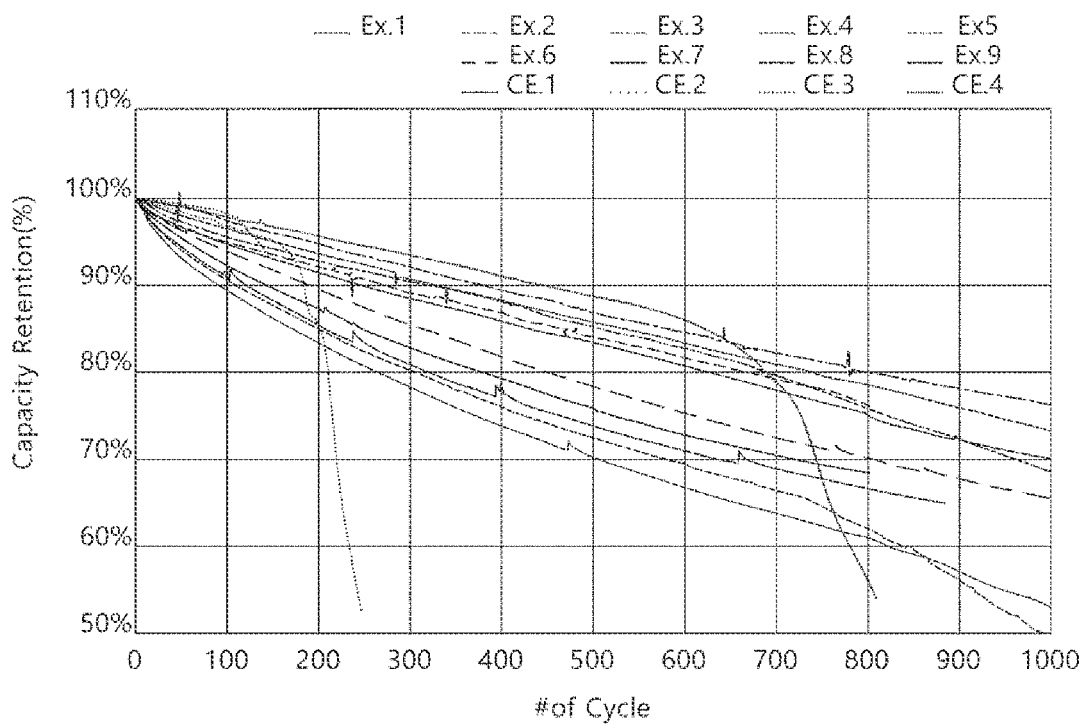
FIG. 6 is a graph showing normal (room temperature) life-span characteristics of lithium secondary batteries according to Examples 1 to 9 and Comparative Examples 1 to 4.

The capacity retention according to a cycle number (# of cycle) is shown in FIG. 6, and capacity retentions at the 600th and the 800th cycles are shown in Table 3.

2. Evaluation on Rapid Charge Life-Span Properties

The lithium secondary batteries manufactured according to Examples 1 to 9 and Comparative Examples 1 to 4 were charged to reach DOD72 within 35 minutes by a step charging method at 3.0 C/2.75 C/2.5 C/2.25 C/2.0 C/1.75 C/1.5 C/1.25 C/1.0 C/0.75 C/0.5 C C-rates, and then discharged at 0.5 C. The charge and discharge were set to a single cycle, and 300 cycles were performed with an interphase of 20 minutes between the charge and discharge cycles.

Figure 7:
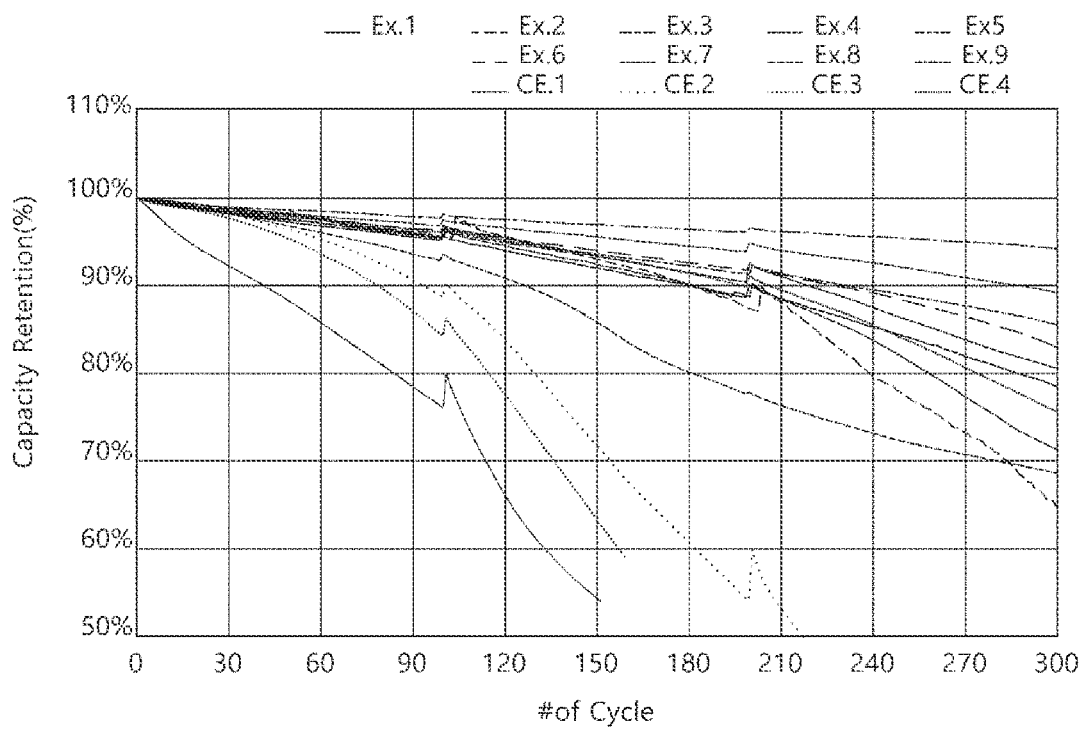
FIG. 7 is a graph showing rapid charging life-span characteristics of lithium secondary batteries according to Examples 1 to 9 and Comparative Examples 1 to 4.

A discharge capacity according to a cycle number (# of cycle) was measured, and a discharge capacity measured in each cycle was calculated as a ratio (%) to a discharge capacity at the 1st cycle to measure a capacity retention. The capacity retention according to the cycle number (# of cycle) is shown in FIG. 7, and capacity retentions at the 150th and the 300th cycles are shown in Table 3 below.

The contents of components included in each of the anode active material layers of Examples 1 to 9 and Comparative Examples 1 to 4 are shown in Tables 1 and 2 below.

TABLE 1

| | anode active material layer | artificial graphite | natural graphite | first silicon-based active material | second silicon-based active material | CMC | SBR | SWCNT | CNT |
|---|---|---|---|---|---|---|---|---|---|
| Example 1 | single layer | 50.5 | — | 30 | 15 (Mg doping) | 1.5 | 2.5 | 0.2 | 0.3 |
| Example 2 | second anode active material layer | 66.5 | — | 0 | 30 (Li doping) | 1.5 | 1.5 | 0.2 | 0.3 |
| | first anode active material layer | 64.5 | — | 30 | 0 | 1.5 | 3.5 | 0.2 | 0.3 |
| | entire anode active material layer | 65.5 | — | 15 | 15 (Li doping) | 1.5 | 2.5 | 0.2 | 0.3 |

TABLE 1-continued

| | anode active material layer | artificial graphite | natural graphite | first silicon-based active material | second silicon-based active material | CMC | SBR | SWCNT | CNT |
|---|---|---|---|---|---|---|---|---|---|
| | | | | | component (wt %) | | | | |
| Example 3 | second anode active material layer | 66.5 | — | 0 | 30 (Mg doping) | 1.5 | 1.5 | 0.2 | 0.3 |
| | first anode active material layer | 64.5 | — | 30 | 0 | 1.5 | 3.5 | 0.2 | 0.3 |
| | entire anode active material layer | 65.5 | — | 15 | 15 (Mg doping) | 1.5 | 2.5 | 0.2 | 0.3 |
| Example 4 | second anode active material layer | 66.5 | — | 10 | 20 (Mg doping) | 1.5 | 1.5 | 0.2 | 0.3 |
| | first anode active material layer | 64.5 | — | 20 | 10 (Mg doping) | 1.5 | 3.5 | 0.2 | 0.3 |
| | entire anode active material layer | 65.5 | — | 15 | 15 (Mg doping) | 1.5 | 2.5 | 0.2 | 0.3 |
| Example 5 | second anode active material layer | 66.5 | — | 30 | 0 | 1.5 | 1.5 | 0.2 | 0.3 |
| | first anode active material layer | 64.5 | — | 0 | 30 (Mg doping) | 1.5 | 3.5 | 0.2 | 0.3 |
| | entire anode active material layer | 65.5 | — | 15 | 15 (Mg doping) | 1.5 | 2.5 | 0.2 | 0.3 |
| Example 6 | anode active material layer | 51.5 | — | 30 | 15 (Mg doping) | 1.5 | 1.5 | 0.2 | 0.3 |
| | primer layer | — | — | — | — | — | 2.0 | — | — |
| Example 7 | single layer | 50.5 | — | 30 (carbon coating formation) | 15 (Mg doping) | 1.5 | 2.5 | 0.2 | 0.3 |
| Example 8 | single layer | — | 50.5 | 30 | 15 (Mg doping) | 1.5 | 2.5 | 0.2 | 0.3 |
| Example 9 | single layer | 30.35 | 20.15 | 30 | 15 (Mg doping) | 1.5 | 2.5 | 0.2 | 0.3 |

TABLE 2

| | anode active material layer | artificial graphite | natural graphite | first silicon-based active material | second silicon-based active material | CMC | SBR | SWCNT | CNT |
|---|---|---|---|---|---|---|---|---|---|
| | | | | | component (wt %) | | | | |
| Comparative Example 1 | single layer | 50.5 | — | 45 | — | 1.5 | 2.5 | 0.2 | 0.3 |
| Comparative Example 2 | single layer | 50.5 | — | — | 45 (Mg doping) | 1.5 | 2.5 | 0.2 | 0.3 |
| Comparative Example 3 | single layer | 50.5 | — | 1 | 44 (Mg doping) | 1.5 | 2.5 | 0.2 | 0.3 |
| Comparative Example 4 | second anode active material layer | 66.5 | — | — | 30 (Mg doping) | 1.5 | 1.5 | 0.2 | 0.3 |

TABLE 2-continued

| anode active material layer | artificial graphite | natural graphite | first silicon-based active material | second silicon-based active material | CMC | SBR | SWCNT | CNT |
|---|---|---|---|---|---|---|---|---|
| first anode active material layer | 64.5 | — | — | 30 (Mg doping) | 1.5 | 3.5 | 0.2 | 0.3 |
| entire anode active material layer | 65.5 | — | — | 30 (Mg doping) | 1.5 | 2.5 | 0.2 | 0.3 |

Results of evaluating normal (room temperature) life-span characteristics and rapid charge life-span characteristics of the lithium secondary batteries manufactured according to Examples 1 to 9 and Comparative Examples 1 to 4 are shown in Table 3 below.

The case where the discharge capacity was lowered to a state incapable of being measured before performing all the charge/discharge cycles determined in the evaluation of each life-span characteristic was denoted as "—."

retention. Specifically, higher rapid charge capacity retention (300 cycles) than that from the lithium secondary battery of Example 2 using Li-doped silicon oxide was provided.

In the lithium secondary battery of Example 6 where the primer layer was introduced and the lithium secondary battery of Example 7 where the carbon coating layer was formed on the outermost portion of the first silicon-based active material, higher normal (room temperature) life-span

TABLE 3

| | normal (room temperature) charge capacity retention (600 cycles, %) | normal (room temperature) charge capacity retention (800 cycles, %) | rapid charge capacity retention (150 cycles, %) | rapid charge capacity retention (300 cycles, %) |
|---|---|---|---|---|
| Example 1 | 72.9 | 68.6 | 92.1 | 78.6 |
| Example 2 | 81.6 | 76.2 | 93.1 | 64.7 |
| Example 3 | 84.4 | 79.9 | 97.1 | 94.3 |
| Example 4 | 83.3 | 78.5 | 95.7 | 89.3 |
| Example 5 | 82.7 | 75.9 | 93.7 | 85.7 |
| Example 6 | 75.4 | 70.2 | 94.2 | 83.1 |
| Example 7 | 80.8 | 74.9 | 93.5 | 80.7 |
| Example 8 | 69.5 | 62.1 | 85.9 | 68.6 |
| Example 9 | 71.1 | 66.7 | 92.6 | 71.4 |
| Comparative Example 1 | 66.9 | 61.1 | 54.2 | — |
| Comparative Example 2 | — | — | 71.7 | — |
| Comparative Example 3 | — | — | 63.3 | — |
| Comparative Example 4 | 85.9 | 55.9 | 93.5 | 75.7 |

Referring to Table 3, in the lithium secondary batteries of Examples 1 to 9 where the content of the first silicon-based active material was within a range of 2 wt % to 40% based on the total weight of the anode active material layer, the normal (room temperature) life-span characteristics and the rapid charging life-span characteristics were improved compared to those from the lithium secondary batteries of Comparative Examples 1 to 4.

In the lithium secondary batteries of Examples 2 to 4 where the first anode active material layer contained a relatively large amount of the first silicon-based active material, the normal (room temperature) charge capacity retention and the rapid charge capacity retention were higher than those of the lithium secondary batteries of other Examples.

The lithium secondary battery of Example 3 using Mg-doped silicon oxide provided higher normal (room temperature) charge capacity retention and rapid charge capacity characteristics and rapid charge life-span characteristics than those in the lithium secondary battery of Example 1 were provided.

In the lithium secondary battery of Example 8 using natural graphite instead of artificial graphite, the normal (room temperature) charging capacity and the rapid charge capacity retention were lower than those from the lithium secondary battery of Example 1 and the lithium secondary battery of Example 9 where the content of natural graphite was lower than that of artificial graphite.

What is claimed is:
1. An anode for a lithium secondary battery, comprising:
an anode current collector; and
an anode active material layer formed on at least one surface of the anode current collector, wherein the anode active material layer includes a carbon-based active material, a first silicon-based active material including a carbon-silicon composite active material, and a second silicon-based active material including a silicon oxide represented by $SiO_x$, wherein $0<x<2$, wherein a content of the first silicon-based active material is in a range from 2 wt % to 40 wt % based on a total weight of the anode active material layer, and wherein the carbon-silicon composite active material includes a porous carbon core and a silicon coating formed on the porous carbon core, and wherein a sum of contents of the first silicon-based active material and the second silicon-based active material is in a range from 30 wt % to 60 wt % based on the total weight of the anode active material layer.

2. The anode for a lithium secondary battery according to claim 1, wherein the anode active material layer comprises a first anode active material layer and a second anode active material layer sequentially stacked from a surface of the anode current collector.

3. The anode for a lithium secondary battery according to claim 2, wherein the first anode active material layer includes the first silicon-based active material and the carbon-based active material, and the second anode active material layer includes the second silicon-based active material and the carbon-based active material.

4. The anode for a lithium secondary battery according to claim 2, wherein the first anode active material layer and the second anode active material layer include the first silicon-based active material and the second silicon-based active material, respectively, a content of the first silicon-based active material included in the first anode active material layer is greater than or equal to a content of the second silicon-based active material included in the first anode active material layer, and a content of the first silicon-based active material included in the second anode active material layer is less than or equal to a content of the second silicon-based active material included in the second anode active material layer.

5. The anode for a lithium secondary battery according to claim 2, wherein the first anode active material layer includes the second silicon-based active material and the carbon-based active material, and the second anode active material layer includes the first silicon-based active material and the carbon-based active material.

6. The anode for a lithium secondary battery according to claim 2, wherein the first anode active material layer and the second anode active material layer include the first silicon-based active material and the second silicon-based active material, respectively, a content of the first silicon-based active material included in the first anode active material layer is less than or equal to a content of the second silicon-based active material included in the first anode active material layer, and a content of the first silicon-based active material included in the second anode active material layer is greater than or equal to a content of the second silicon-based active material included in the second anode active material layer.

7. The anode for a lithium secondary battery according to claim 1, wherein a content of the second silicon-based active material is in a range from 3 wt % to 30 wt % based on the total weight of the anode active material layer.

8. The anode for a lithium secondary battery according to claim 1, wherein the carbon-based active material includes artificial graphite.

9. The anode for a lithium secondary battery according to claim 8, wherein the carbon-based active material further includes natural graphite, and a content of natural graphite included in the anode active material layer is less than or equal to a content of artificial graphite included in the anode active material layer.

10. The anode for a lithium secondary battery according to claim 1, wherein the carbon-silicon composite active material further includes a coating layer formed at an outermost portion of the carbon-silicon composite active material.

11. The anode for a lithium secondary battery according to claim 10, wherein the coating layer includes at least one selected from the group consisting of a carbon coating, an oxide film coating and a polymer coating.

12. The anode for a lithium secondary battery according to claim 1, wherein the second silicon-based active material includes at least one dopant selected from the group consisting of Li, Mg, Al, Ca, Fe, Ti and V.

13. The anode for a lithium secondary battery according to claim 1, further comprising a primer layer disposed between the anode current collector and the anode active material layer, the primer layer including an anode binder.

14. The anode for a lithium secondary battery according to claim 13, wherein the anode binder includes at least one selected from the group consisting of styrene-butadiene rubber (SBR), carboxymethyl cellulose (CMC), polyacrylic acid (PAA) and polyvinyl alcohol (PVA).

15. The anode for a lithium secondary battery according to claim 13, wherein the primer layer further includes at least one selected from the group consisting of the carbon-based active material, the first silicon-based active material and the second silicon-based active material.

16. A lithium secondary battery, comprising:
the anode for a lithium secondary battery of claim 1; and
a cathode facing the anode.

* * * * *